(12) United States Patent
Wada

(10) Patent No.: US 8,297,617 B2
(45) Date of Patent: Oct. 30, 2012

(54) DOCUMENT CARRYING APPARATUS

(75) Inventor: Hiroshi Wada, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 1063 days.

(21) Appl. No.: 12/285,092

(22) Filed: Sep. 29, 2008

(65) Prior Publication Data

US 2009/0097082 A1    Apr. 16, 2009

(30) Foreign Application Priority Data

Oct. 2, 2007   (JP) .................................. 2007-258423

(51) Int. Cl.
*G03G 15/00* (2006.01)

(52) U.S. Cl. ........ 271/264; 271/3.14; 399/379; 399/380

(58) Field of Classification Search ................. 271/3.14, 271/264; 358/498; 399/379, 380, 367

See application file for complete search history.

(56) References Cited

U.S. PATENT DOCUMENTS

| 5,338,018 | A  | * | 8/1994  | Nagao et al. | 271/3.05 |
| 5,825,513 | A  | * | 10/1998 | Hasegawa     | 358/498  |
| 2007/0069445 | A1 | * | 3/2007 | Kakuta       | 271/3.14 |
| 2007/0183004 | A1 | * | 8/2007 | Jo           | 358/498  |

FOREIGN PATENT DOCUMENTS

| JP | 2002281238 A | * | 9/2002 |
| JP | 3499193 | | 12/2003 |
| JP | 2004-61978 | | 2/2004 |
| JP | 3585723 | | 8/2004 |

* cited by examiner

*Primary Examiner* — Luis A Gonzalez
(74) *Attorney, Agent, or Firm* — Smith, Gambrell & Russell, LLP

(57) ABSTRACT

A document carrying apparatus comprises a main body, and a reading guide member which guides a document in such a manner that the document comes into contact with a platen glass. The reading guide member is supported on the main body by two support portions disposed on the front side and rear side. The rear-side support portion energizes the reading guide member with the aid of an energizing member in such a manner that the reading guide member can be displaced in the directions to come close and move away to and from the platen glass, while the front-side support portion supports the reading guide member in such a manner that the reading guide member can be displaced in the directions to come close and move away to and from the platen glass in a space smaller than that formed in the rear-side support portion.

8 Claims, 8 Drawing Sheets

DOCUMENT CARRYING APPARATUS

This application is based on Japanese Patent Application No. 2007-258423 filed on Oct. 2, 2007, the contents of which are hereby incorporated by reference.

BACKGROUND OF THE INVENTION

1. Field of the Invention

The present invention relates to a document carrying apparatus applicable to an image forming apparatus, typically, a copying machine or a facsimile.

2. Description of Related Art

There are image forming apparatuses such as a copying machine, a facsimile, and the like that comprise a document carrying apparatus which automatically carries a plurality of documents to a document reading portion. The document carrying apparatus separates a document located at the uppermost position of documents piled up on a document placement tray one after another and carries them. Image data on a surface of a document is read by a document reading portion, then, the document is delivered to a document delivery tray disposed at the downstream end of a document carrying passage.

During the time when a document is carried on a platen glass of the document reading portion, image data on the surface of the document is read by a reading unit disposed under the platen glass. Therefore, through the document reading portion, a document must be carried in a suitable carrying state making a contact with the platen glass. Examples of such document carrying apparatuses that improve the document reading performance of the document reading portion can be seen in Japanese Patent Nos. 3499193, 3585723 and JP-A-2004-61978. The document carrying apparatuses described in these patent documents are each disposed facing the platen glass of the document reading apparatus and include a reading guide member that guides a document in such a manner that the document comes into contact the platen glass.

In the automatic document carrying apparatuses described in Japanese Patent No. 3499193 and JP-A-2004-61978, the reading guide member is disposed rotatably in a vertical plane on the pivot shaft that is arranged on the upstream side in the document carrying direction and has the axis extending in the direction perpendicular to the document carrying direction. Thus, the document carrying state at the document reading portion can be stabilized. However, distortion can occur in the vertical direction and the document carrying direction in the reading guide member that is pivotally supported in such state. Accordingly, there is a possibility that the distance between the reading guide member and the platen glass changes from place to place, that is, becomes narrow at a place and wide at another place, and the position of a document with respect to the platen glass cannot be set precisely. And, it is high in the possibility that the document carrying passage deviates from its usual position on the front side and the rear side of the document carrying apparatus.

In the document reading apparatus (the document carrying apparatus) described in Japanese Patent No. 3585723, the reading guide member is supported by a hole having a diameter larger than the pivot shaft that extends in the direction perpendicular to the document carrying direction so that the reading guide member can be moved in the document carrying direction and the vertical direction. Accordingly, it is possible to precisely set the position of a document with respect to the platen glass by disposing the reading guide member along the positioning guide member arranged on the side of the platen glass. However, on the other hand, a deviation can occur in the positional relationship between the reading guide member and the other carrying guide members on the upstream and downstream sides in the document carrying direction of the reading guide member, thereby the document carrying space can change in size and shape. During the time when a document is carried, such a positional deviation of the reading guide member and a change in the document carrying passage caused by the positional deviation can put a burden on the guide member and the document to fluctuate the document carrying speed. Consequently, the document carrying state becomes unstable and a defective image appears.

Besides, as in the above-mentioned document carrying apparatuses described in Japanese Patent No. 3499193 and JP-A-2004-61978, there is a possibility that the document carrying passage changes on the front and rear sides of the document carrying apparatus. Such a trouble can cause not only a change in the length of the document carrying passage for the document carriage and a deviation from perpendicularity but also a problem with an image such as a defective magnification between the front side and the rear side of the document carrying apparatus.

SUMMARY OF THE INVENTION

The present invention has been made to cope with the conventional problems, and it is an object of the present invention to provide a document carrying apparatus that can keep the positional relationship between a document and the platen glass at the document reading portion in a suitable state, improve the document reading performance, and generate a high-quality image.

To achieve the object, a document carrying apparatus according to the present invention is as follows:

A document carrying apparatus whose front side is rotatably supported to move up and down on the rotation shaft that is so disposed on a rear side of a document reading apparatus as to be substantially parallel with the document carrying direction so that the document carrying apparatus can be opened and closed with respect to the document reading apparatus, the document carrying apparatus comprises:

a main body; and a reading guide member which is disposed facing a platen glass of the document reading apparatus, abuts the platen glass in the closed state with respect to the document reading apparatus to guide a document in such a manner that the document comes in contact with the platen glass, wherein the reading guide member includes support portions on the end portions of the front and rear sides thereof, each of the support portions includes: an engagement portion engaging with the main body; and a contact portion abutting the platen glass, the reading guide member is supported by the main body via the supporting portions, in the opened state with respect to the document reading apparatus, the rear-side support portion is supported by the main body with an energizing member in such a manner that the rear-side support portion can be displaced to come close and move away to and from the main body, and the front-side support portion is supported by the main body in such a manner that the front-side support portion can be displaced to come close and move away to and from the main body, in the closed state with respect to the document reading apparatus, at the rear-side support portion, the contact portion comes into contact with the platen glass, and at the front-side support portion, the engagement portion abuts the main body, and the contact portion abuts the platen glass to carry out the positioning of the reading guide member in the height direction on the front side.

According to this structure, it is possible to prevent the reading guide member from moving in the document carrying direction. Accordingly, distortion of the reading guide member and deviation from the usual positional relationship between the reading guide member and the other carrying guide members on the upstream and downstream sides can be prevented from occurring. And in the closed state with respect to the document reading apparatus, because the reading guide member abuts the main body and the platen glass, the front-side support portion can prevent changes in the positional relationship between these members from appearing. Thus, it is possible to provided a document carrying apparatus that can keep the positional relationship between a document and the platen glass of the document reading portion in a suitable state, improve the document reading performance, and produce a high-quality image.

Besides, in the document carrying apparatus having the structure described above, the reading guide member is supported on the main body with screws at the front-side supporting portion and the rear-side supporting portion, and can be displaced between the screw head and the main body in both the direction to come close to the platen glass and the direction to move away from the platen glass.

According to this structure, because the space in which the reading guide member moves can be set with the screws, that is, the members used to mount the reading guide member, no additional members are needed to limit the movement of the reading guide member. Besides, the space in which the reading guide member moves can be easily changed by tightly fastening or loosely fastening the screws. Thus, it is possible to keep the positional relationship between a document at the document reading portion and the platen glass in a suitable state at low cost.

In the document carrying apparatus having the structure described above, a screw is inserted through a through-hole formed through the engagement portion that extends on the rear side of the reading guide member substantially horizontally, and the rear-side support portion is supported in such a manner that it can move in the gap between the screw head and the main body.

According to this structure, using a low-cost and simplified structure, at the rear-side support portion supporting the reading guide member, it is possible to easily keep the positional relationship between a document and the platen glass in a suitable state using an energizing member.

In the document carrying apparatus having the structure described above, a boss portion formed on the main body is inserted through a through-hole formed through the engagement portion that extends on the front side of the reading guide member substantially horizontally, and the front-side support portion is supported in such a manner that it can move in the gap between the screw head and the main body outside the boss portion.

According to this structure, using a low-cost and simplified structure, at the front-side support portion supporting the reading guide member, it is possible to easily keep the positional relationship between a document and the platen glass in a suitable state.

In the document carrying apparatus having the structure described above, the gap in the front-side support portion is formed smaller than that in the rear-side support portion.

According to this structure, even if the reading guide member considerably moves with respect to the platen glass at the rear-side support portion, a small movement at the front-side support portion can prevent not only a positional deviation with respect to the platen glass but also deformation of the reading guide member from occurring. Besides, because the movement amount of the reading guide member at the front-side support portion is formed smaller than that of the reading guide member at the rear-side support portion, a structure similar to the structure in which the reading guide member is mounted on the main body in such a manner that the front-side support portion cannot make any movement can be obtained, thereby a considerably large positional deviation of the reading guide member with respect to the platen glass can be prevented from occurring.

In the document carrying apparatus having the structure described above, the front-side support portion has: an abut portion that prevents the reading guide member from being further displaced to move away from the platen glass after the reading guide member abuts the main body; and an elastic member that is disposed between the main body and the reading guide member and energizes the reading guide member toward the platen glass.

According to this structure, when setting a positional relationship between the reading guide member and the platen glass by making them contact with each other with the document carrying apparatus closed with respect to the document reading apparatus, the effect of absorbing impact generated at the time of closing can be obtained. Besides, at the time of opening and closing the document carrying apparatus, noise can be prevented from being generated when the reading guide member intermittently comes into contact with the main body. Accordingly, the positional relationship between a document and the platen glass at the document reading portion can be kept in a suitable state, and the document reading performance can be improved. In addition, the effects of impact absorption and noise prevention at the front-side support portion supporting the reading guide member can also be obtained.

DETAILED DESCRIPTION OF PREFERRED EMBODIMENTS

Hereinafter, embodiments of the present invention are explained based on FIGS. 1 to 8.

Figure 1:
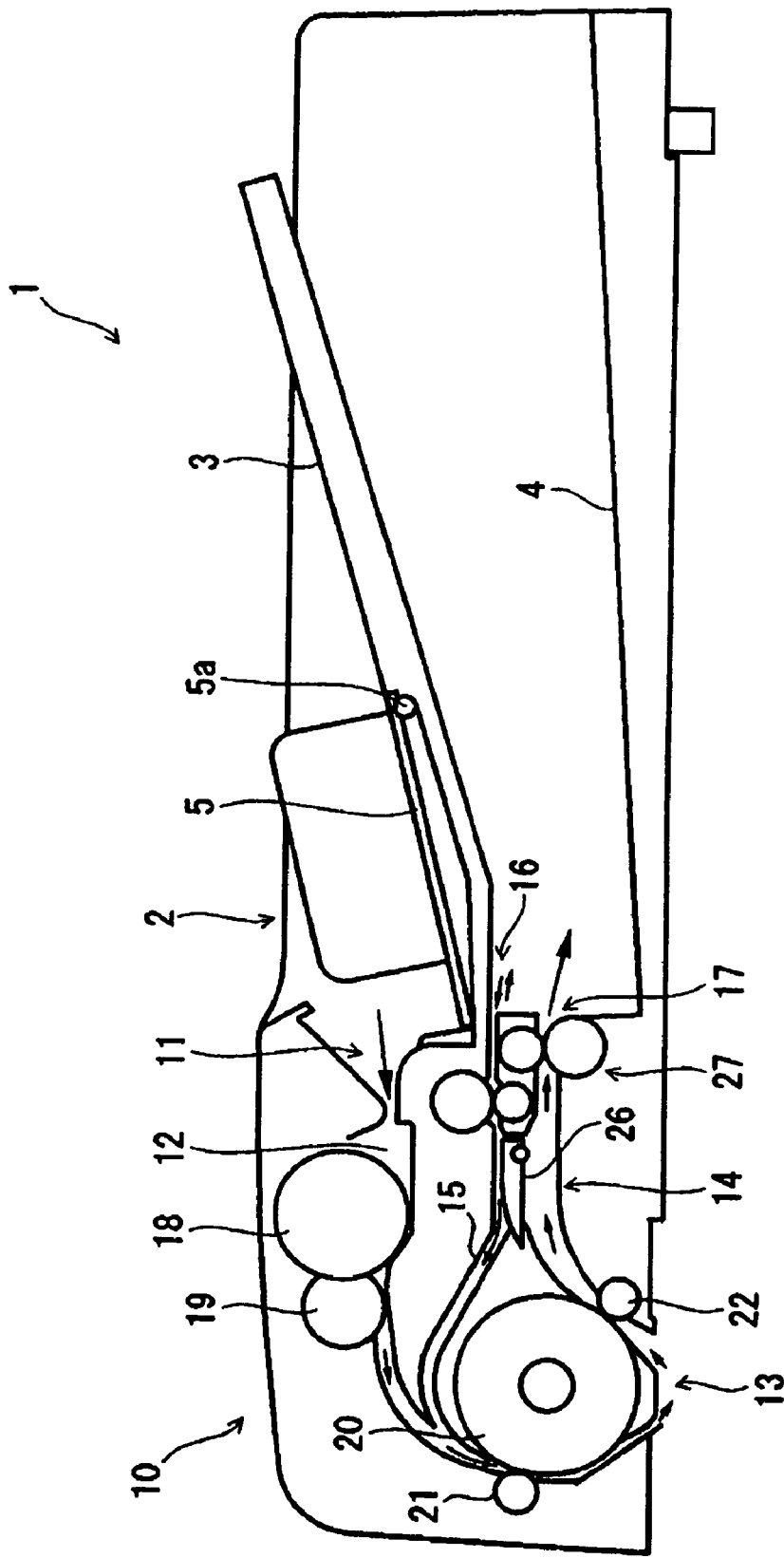
FIG. 1 is a schematic front view in vertical section of a document carrying apparatus according to a first embodiment of the present invention.
Figure 2:
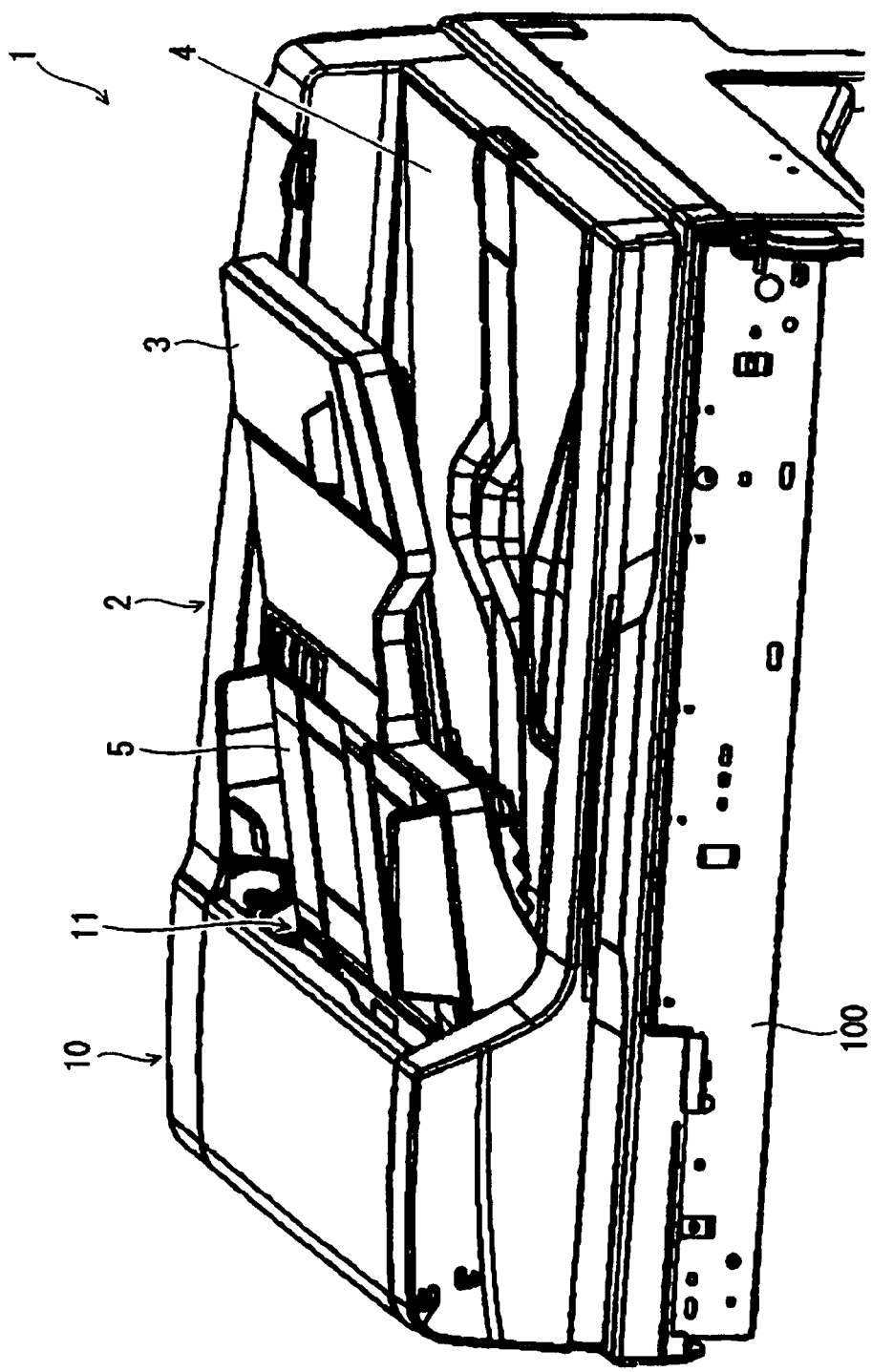
FIG. 2 is a perspective view seen from above the document carrying apparatus in FIG. 1.
Figure 3:
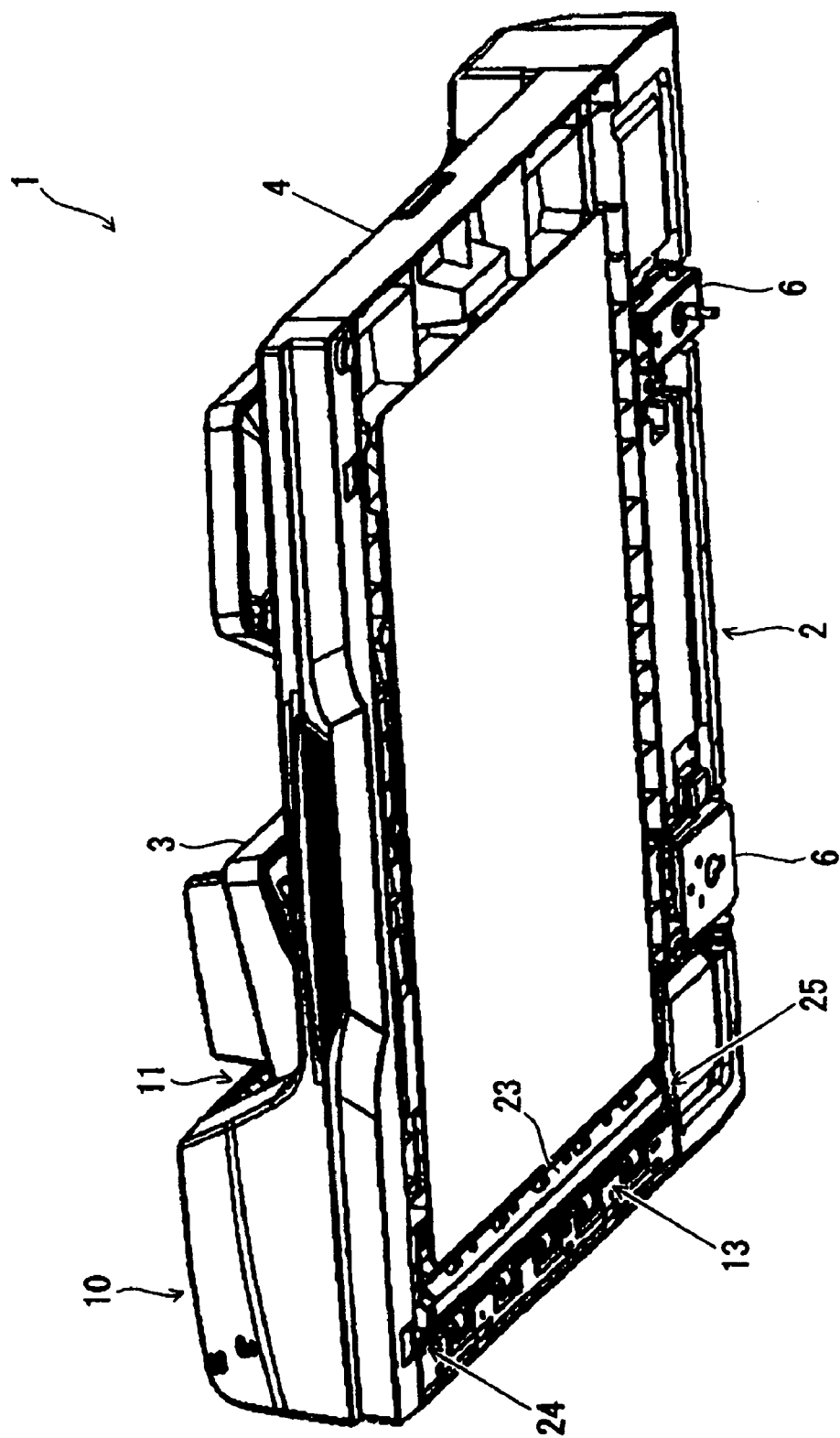
FIG. 3 is a perspective view seen from below the document carrying apparatus in FIG. 1.

First, a schematic structure of a document carrying apparatus according to a first embodiment of the present invention is described using FIGS. 1 to 3. FIG. 1 is a schematic front view in vertical section of the document carrying apparatus, FIG. 2 is a perspective view seen from above the document carrying apparatus, and FIG. 3 is a perspective view seen from below the document carrying apparatus. Solid arrows in FIG. 1 indicate document carrying passages and document carrying directions. The document carrying apparatus according to the present invention is designed as a document carrying apparatus installed on an image forming apparatus such as a copying machine and a facsimile, or a multifunction machine that has the functions of a copying machine and a facsimile concurrently.

As shown in FIGS. 1 and 2, the document carrying apparatus 1 comprises a main body 2, a document placement tray 3, a document feed portion 10, and a document delivery tray 4 in the main body 2.

The document placement tray 3 is disposed on the upper portion of the document carrying apparatus 1. Documents can be placed and piled up on the document placement tray 3 from above the tray. The document placement ray 3 is so structured as to be tilted from the upstream to the downstream in the document carrying direction, that is, from the right to the left in FIG. 1.

A lift member 5 is disposed in the downstream in the document carrying direction with respect to the document placement tray 3. The lift member 5 is formed of a plate member having a shape along the placement surface of the document placement tray 3. As shown in FIG. 1, the lift member 5 is so arranged as to rotate in a vertical plane on a pivot shaft 5a disposed in the upstream portion with the downstream end as the free end. The lift member 5 is driven by a motor, not shown, to rotate on the pivot shaft 5a. Accordingly, a document placed on the document placement tray 3 is pushed upward by the downstream end of the lift member 5 so that the document surely comes into contact with a feed roller (not shown) disposed over the downstream end.

The document feed portion 10 has a document feed slot 11 at the downstream end in the document carrying direction with respect to the document placement tray 3. The document feed portion 10 feeds documents piled up on the document placement tray 3 beginning with the uppermost document toward the inside of the document feed portion 10 via the document feed slot 11. As shown in FIG. 1, in the downstream from the document feed slot 11, a document carrying passage 12 extends toward the inside of the document feed portion 10.

The document carrying passage 12 extends to the bottom surface of the document carrying apparatus 1, where a document reading portion 13 is disposed (see FIG. 3). A document fed into the document reading portion 13 is further carried toward the downstream through the document carrying passage 12, that is, from the left to the right of the document reading portion 13 in FIG. 1, during which image data on a first surface, that is, one surface of the document is read by a document reading apparatus (not shown) of an image forming apparatus disposed under the document reading portion 13.

A branch portion 14 is disposed in the downstream of the document carrying passage 12 with respect to the document reading portion 13. When it is necessary to read image data on both surfaces of a document, a document carried to the branch portion 14 is sent into a document carrying passage 15 (dual-reading document carrying passage) for dual-side reading formed over the document carrying passage 12, and the document carriage direction is switched by a switchback portion 16 disposed in the downstream of the document carrying passage 15. The document whose carriage direction is switched is carried through the upper part of branch portion 14 and the document carrying passage 15 and again fed into the document carrying passage 12 in the upstream with respect to the document reading portion 13. Then, image data on a second surface is read by the document reading portion 13.

A document delivery slot 17 is disposed at the downstream with respect to the branch portion 14, that is, the downstream end of the document carrying passage 12. A document whose image data is already read is delivered into the document delivery tray 4 via the document delivery slot 17.

The document delivery tray 4 is disposed just under the document placement tray 3, which forms a two-tray structure. A document delivered into the document delivery tray 4 can be taken out from the front side of the document carrying apparatus 1 (see FIG. 2).

The document placement tray 3 and the document delivery tray 4 are arranged with the document carrying directions opposite to each other, that is, as shown in FIG. 1, it is so structured that in FIG. 1, the document placement tray 3 feeds a document toward the left, and the document delivery tray 4 delivers a document toward the right. According to this structure, the document feed slot 11 and the document delivery slot 17 are disposed on the same side of each tray with respect to the document reading portion 13, that is, on the left side of each tray. And the document carrying passage 12 extending from the document feed slot 11 to the document delivery slot 17 is so formed as to have substantially a laid-on-side U shape.

According to the structure described above, the document carrying apparatus 1 separates a document from documents piled up on the document placement tray 3 one after another, feeds them inside the document feed portion 10, read image data on them at the document reading portion 13, and delivers them into the document delivery tray 4.

As shown in FIG. 3, the document carrying apparatus 1 has hinge mechanisms 6 on its rear side. The hinge mechanisms 6 have a rotation shaft extending in the direction substantially parallel with the document carriage direction, that is, substantially the horizontal direction from right to left when seen from the front side of the document carrying apparatus 1. The document carrying apparatus 1 is connected to the rear side of the upper portion of an image forming apparatus (not shown) via the hinge mechanisms 6, and can be opened and closed with respect to a document reading apparatus (not shown) disposed under the document carrying apparatus by moving the front side up and down.

Figure 4:
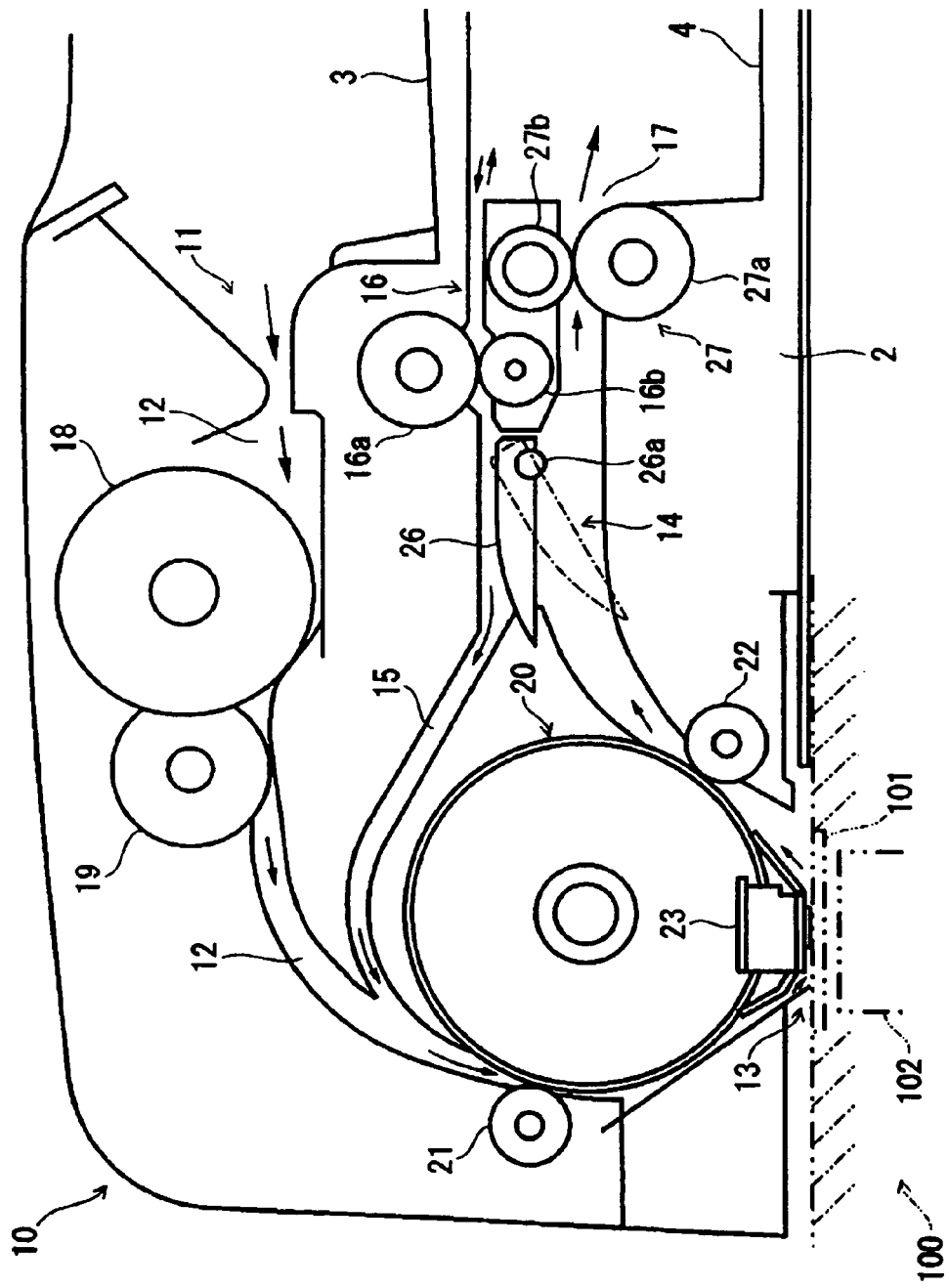
FIG. 4 is a schematic front view in vertical section showing a document feed portion of the document carrying apparatus in FIG. 1.
Figure 5:
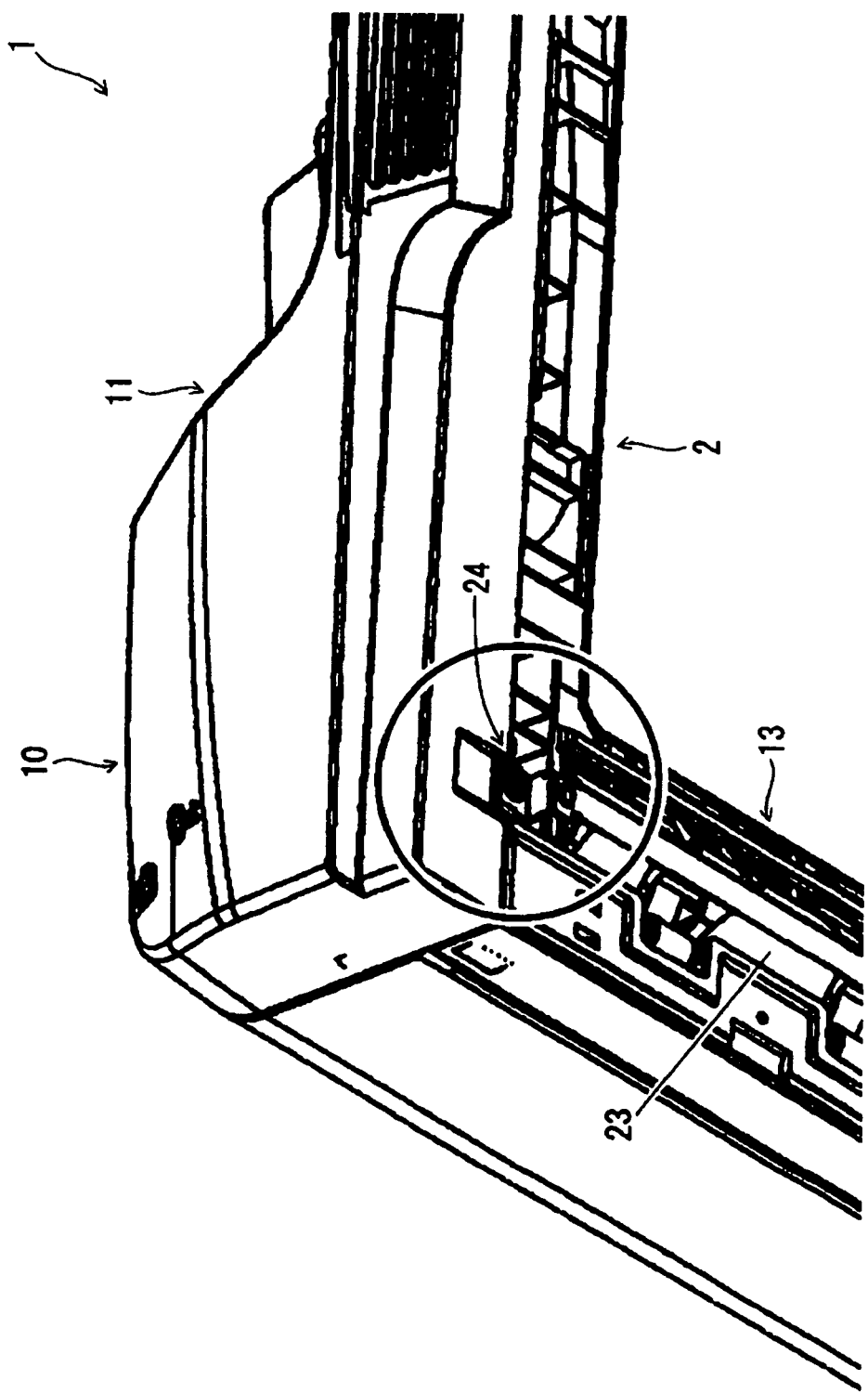
FIG. 5 is a partially enlarged view seen from below the front-side portion of the document feed portion in FIG. 4.

Next, the structure of the document feed portion 10 of the document carrying apparatus 1 is described in detail using FIGS. 4, 5 besides FIG. 3. FIG. 4 is a schematic front view in vertical section showing the document feed portion of the document carrying apparatus, and FIG. 5 is a partially enlarged view seen from below the front-side portion of the document feed portion. In FIG. 4, solid-line arrows indicate the document carrying passages and the document carrying directions.

As described above, the document feed portion 10 has the document feed slot 11 at the downstream end of the document placement tray 3 in the document carrying direction (see FIG. 4). As shown in FIG. 4, the document carrying passage 12 extends substantially horizontally toward the downstream side with respect to the document feed slot 11, and further downward.

On the document carrying passage 12, feed rollers 18, 19 are disposed in the nearby downstream with respect to the document feed slot 11. The feed rollers 18, 19 feed a document carried inside the document feed portion 10 from the document placement tray 3 via the document feed slot 11 toward the document reading portion 13 located in the downstream.

A relatively large-diameter feed roller 20 is disposed in the downstream with respect to the feed roller 19. The document carrying passage 12 has a length equal to about half of the circumferential length of the large-diameter feed roller 20, and extends toward the downstream along the circumferential surface of the roller 20. In other words, the document carrying passage 12 extends toward the left in FIG. 4 in the upstream with respect to the large-diameter 20, and toward the right in the downstream. Two rollers 21, 22 which are pushed against the large-diameter roller 20 to come into tight contact with the roller 20 are disposed.

The document reading portion 13 is disposed between the rollers 21, 22 which are pushed against the large-diameter roller 20. As shown in FIGS. 3 to 5, the document reading portion 13 is equipped with a reading guide member 23.

The reading guide member 23 is disposed facing a platen glass 101 of a document reading apparatus 100 arranged under the document reading portion 13. The reading guide member 23 extends in the document-width direction perpendicular to the document carrying direction, that is, in the front-to-rear side direction of the document carrying apparatus 1, and its document guide portion that is the main part of the reading guide member 23 has a convex shape extending downward. In the closed state with respect to the document reading apparatus 100 of the document carrying apparatus 1, the reading guide member 23 abuts the platen glass 101 to guide a document so that the document carried between the reading guide member 23 and the platen glass 101 comes into contact with the platen glass 101.

The reading guide member 23 is supported on the main body 2 of the document carrying apparatus 1 via a front-side support portion 24 and a rear-side support portion 25 which are disposed on the end portions of the front and rear sides of the reading guide member 23, respectively. The front-side support portion 24 is disposed in an area indicated by a circle in FIG. 5. Structures of the front-side support portion 24 and the rear-side support portion 25 are explained later.

A document fed into the document reading portion 13 is further carried toward the downstream through the document carrying passage 12, that is, carried under the reading guide portion 23 from the left to the right in FIG. 4, during which, that is, during the time when the document is carried on the platen glass 101, image data on a first surface, that is, one surface of the document is read by a document reading unit 102 disposed under the platen glass 101.

The branch portion 14 is disposed in the downstream of the document carrying passage 12 with respect to the document reading portion 13. The branch portion 14 is equipped with a movable guide 26 that can rotate in a vertical plane on a pivot shaft 26*a* which extends substantially horizontally in the front-to-rear side direction. The movable guide 26 extends in the document-width direction, that is, in the front-to-rear side direction of the document carrying apparatus 1, and has a wedge shape in vertical section when seen from the front side so that it can easily change the passage of a document.

The dual-reading document carrying passage 15 is arranged substantially over the document carrying passage 12 running in the downstream with respect to the document reading portion 13. When it is necessary to read image data on both surfaces of a document, the movable guide 26 of the branch portion 14 is moved downward (one-dot-one-bar line in FIG. 4) to send a document, whose image data on the first surface is already read at the document reading portion 13, from the document carrying passage 12 into the dual-reading document carrying passage 15.

A switchback portion 16 is disposed in the downstream of the dual-reading document carrying passage 15 with respect to the branch portion 14. The switchback portion 16 is also disposed above the document delivery slot 17. The switchback portion 16 comprises switchover rollers 16*a*, 16*b* which form a nip to carry a document contacting with each other. The switchback portion 16 delivers the downstream portion of a document carried from the left to the right in FIG. 4 into the document delivery tray 4, reverses the rotation of the switchover roller 16*a* when the upstream portion of the document comes close to the switchover roller 16*a* with the document held in the nip formed by the switchover rollers 16*a* and 16*b*, thereby switches the document carrying direction from the right to the left.

The dual-reading document carrying passage 15 extends from the branch portion 14 to the left over the large-diameter feed roller 20, and joins the document carrying passage 12 at the upstream with respect to the document reading portion 13. The document whose carriage direction has been switched is carried over the large-diameter feed roller 20 into the document carrying passage 12, and again fed to the document reading portion 13, where image data on a second surface, that is, the other surface of the document is read.

At the downstream end of the document carrying passage 12 with respect to the branch portion 14, the document delivery slot 17 and a pair of delivery rollers 27 are disposed. A document whose image is already read is carried by the pair of document delivery rollers 27 composed of delivery rollers 27*a* and 27*b* through the document delivery slot 17, and further delivered into the document delivery tray 4 (see FIG. 1).

Figure 6:
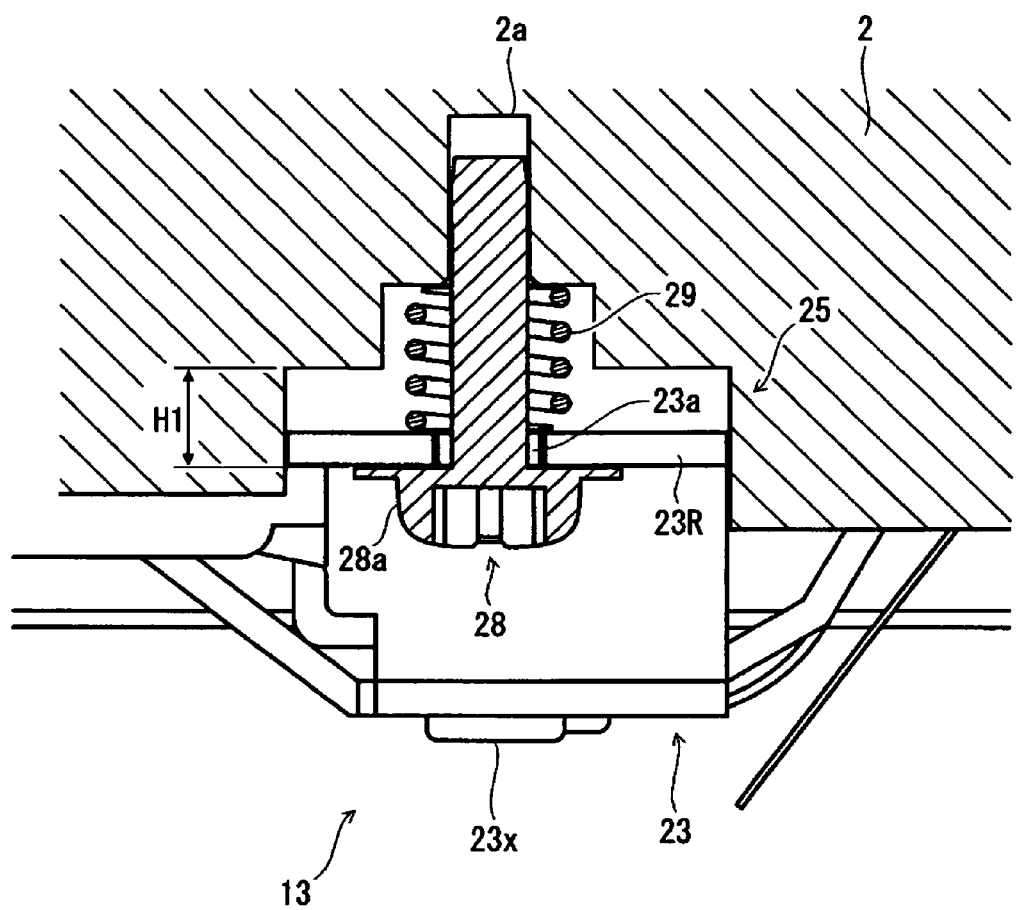
FIG. 6 is a rear view in vertical section showing a rear-side support portion of the reading guide member in FIG. 3.
Figure 7:
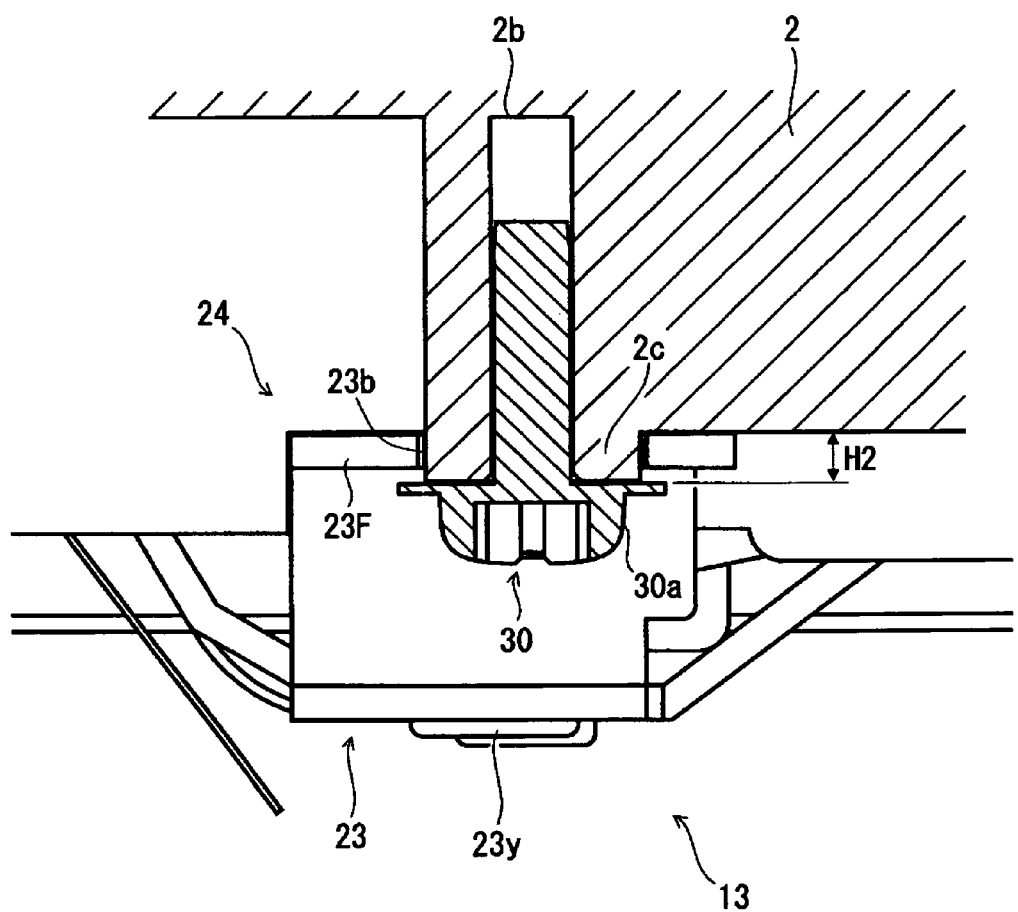
FIG. 7 is a front view in vertical section showing a front-side support portion of the reading guide member in FIG. 3.

Next, structures of the front-side support portion 24 and the rear-side support portion 25 of the reading guide member 23 of the document reading portion 13 are explained using FIGS. 6, 7 besides FIGS. 3, 4. FIG. 6 is a rear view in vertical section showing the rear-side support member, and FIG. 7 is a front view in vertical section showing the front-side support portion.

As explained above using FIG. 3, the reading guide member 23 is supported on the main body 2 of the document carrying apparatus 1 via the front-side support portion 24 and the rear-side support portion 25 which are disposed at the end portions of the front side and the rear side, respectively.

As shown in FIG. 6, the rear-side support portion 25 comprises a mounting screw 28, an engagement portion 23R, a coil spring 29, and a contact portion 23*x*.

The mounting screw 28 is inserted into a screw hole 2*a* formed in the main body 2 in substantially the vertically upward direction. The mounting screw 28 is held with a clearance H1 formed between the screw head 28*a* and the main body 2.

The mounting screw 28 is inserted through a through-hole 23*a* formed through the engagement portion 23R that extends on the rear side substantially horizontally and engages with the main body 2, thereby the reading guide member 23 is held in such a manner that it moves between the head 28*a* of the mounting screw 28 and the main body 2. The clearance H1 is sufficiently larger than the thickness of the engagement portion 23R of the reading guide member 23. When the document carrying apparatus 1 is opened with respect to the document reading apparatus 100, this structure allows the reading guide member 23 to be displaced in the directions to come close and move away to and from the main body 2, that is, in the up and down directions.

The mounting screw 28 is inserted through the coil spring 29, and the coil spring 29 is disposed between the engagement portion 23R of the reading guide member 23 and the main body 2. The coil spring 29 serves as an energizing member that energizes the reading guide member 23 in the direction to move away from the main body 2. According to this structure, when the document carrying apparatus 1 is closed with respect to the document reading apparatus 100, in the rear-side support portion 25, it is possible to make the contact portion 23x of the reading guide member 23 come into tight contact with the platen glass 101.

As shown in FIG. 7, the front-side support portion 24 comprises a mounting screw 30, an engagement portion 23F, and a contact portion 23y.

The mounting screw 30 is inserted into a screw hole 2b formed in the main body 2 in substantially the vertically upward direction. A boss portion 2c protruding downward is formed at the lower end portion of the screw hole 2b of the main body 2. The mounting screw 30 is held in such manner that the screw head 30a and the boss portion 2c of the main body 2 come into tight contact with each other.

The boss portion 2c formed in the main body 2 is inserted through a through-hole 23b formed through the engagement portion 23F that extends on the front side substantially horizontally and engages with the main body 2, thereby the reading guide member 23 is held in such a manner that it moves between the head 30a of the mounting screw 30 and the main body 2 outside the boss portion 2c. The protrusion length of the boss portion 2c is larger than the thickness of the engagement portion 23F of the reading guide member 23, and a clearance H2 is formed here. When the document carrying apparatus 1 is opened with respect to the document reading apparatus 100, this structure allows the reading guide member 23 to be displaced in the directions to come close and move away to and from the main body 2, that is, in the up and down directions.

The front-side clearance H2 is smaller than the rear-side clearance H1 (see FIG. 6). In other words, the front-side support portion 24 supports the reading guide member 23 in such a manner that the reading guide member 23 is displaced in the directions to come close and move away to and from the platen glass O1 in a space smaller than that formed in the rear-side support portion 25, thereby the positioning of the reading guide member 23 is carried out in the vertical direction at the front side.

When the document carrying apparatus 1 is closed with respect to the document reading apparatus 100, at the front-side support portion 24, the upper surface of the engagement portion 23F of the reading guide member 23 abuts the main body 2, and the contact portion 23y comes into tight contact with the platen glass 101.

As explained above, the front side of the document carrying apparatus 1 is displaced up and down around the rotation shaft that is disposed on the rear side of the document reading apparatus 100 and substantially parallel to the document carrying direction, thereby the document carrying apparatus 1 can be opened and closed with respect to the document reading apparatus 100. The document reading apparatus 1 comprises the main body 2, and the reading guide member 23 which is disposed facing the platen glass 101, abuts the platen glass 101 in the closed state with respect to the document reading apparatus 100, and guides a document in such a manner that the document comes into contact with the platen glass 101. In this document carrying apparatus 1, at the end portions of the front side and the rear side, the reading guide member 23 includes: the engagement portions which engage with the main body 2; and the support portions equipped with the contact portions that abut the platen glass 101. The reading guide member 23 is supported on the main body 2 via these support portions. In the opened state with respect to the document reading apparatus 100, at the rear-side support portion 25, the reading guide member 23 is supported on the main body 2 by the coil spring 29 disposed as the energizing member in such a manner that the reading guide member 23 can be displaced in the directions to come close and move away to and from the main body 2, and at the front-side support portion 24, the reading guide member 23 is supported on the main body 2 in such a manner that the reading guide member 23 can be displaced in the directions to come close and move away to and from the main body 2. In the closed state with respect to the document reading apparatus 100, at the rear-side support portion 25, the contact portion 23x abuts the platen glass 101, and at the front-side support portion 24, the engagement portion 23F abuts the main body 2, and the contact portion 23y abuts the platen glass 101, thereby the poisoning of the reading guide member 23 in the vertical direction on the front side is performed and the reading guide member 23 can be prevented from moving in the document carrying direction. Thus, distortion of the reading guide member 23 and deviation from the usual positional relationship between the reading guide member 23 and the other feed guide members on the upstream and downstream sides can be prevented from occurring.

In the closed state with respect to the document reading apparatus 100, because the reading guide member 23 abuts the main body 2 and the platen glass 101, the front-side support portion 24 can prevent positional deviation among these members from occurring. Thus, it is possible to keep the positional relationship between a document and the platen glass 101 at the document reading portion 13 in a suitable state, and to provide the document carrying apparatus 1 that can improve the document reading performance and allows the production of a high-quality image.

At the front-side support portion 24 and the rear-side support portion 25, because the reading guide member 23 is supported on the main body 2 by the mounting screws 28, 30, and can be displaced in the spaces formed between the screw heads 28a, 30a and the main body 2 in the directions to come close and move away to and from the platen glass 101, the spaces in which the reading guide member 23 is displaced can be set with the mounting screws 28, 30, that is, the members used to mount the reading guide member 23, and no additional members are required to limit the displacement of the reading guide member 23. Besides, the spaces in which the reading guide member 23 is displaced can be easily adjusted by tightly or loosely fastening the mounting screws 28, 30. Thus, it is possible to easily keep the positional relationship between a document and the platen glass 101 at the document reading portion 13 in a suitable state at low cost.

The mounting screw 28 is inserted through the through-hole 23a formed through the engagement portion 23R that extends substantially horizontally on the rear side and engages with the main body 2, thereby the reading guide member 23 is held in such a manner that the reading guide member 23 can be displaced between the head 28a of the mounting screw 28 and the main body 2. Accordingly, in a low-cost and simplified structure, at the rear-side support portion 25 supporting the reading guide member 23, it is possible to easily keep the positional relationship between a document and the platen glass 101 in a suitable state using the coil spring 29 disposed as the energizing member.

The boss portion 2c formed on the main body 2 is inserted through the through-hole 23b formed through the engagement portion 23F that extends substantially horizontally on the front side and engages with the main body 2, thereby the reading guide member 23 is held in such a manner that the reading guide member 23 can be displaced between the head 30a of the mounting screw 30 and the main body 2 outside the boss portion 2c. Accordingly, in a low-cost and simplified structure, at the front-side support portion 24 supporting the reading guide member 23, it is possible to easily keep the positional relationship between a document and the platen glass 101 in a suitable state.

Because the gap, that is, the clearance H2 in the front-side support portion 24 is set smaller than the gap, that is, the clearance H1 in the rear-side support portion 25, even if the reading guide member 23 considerably moves with respect to the platen glass 101 at the rear-side support portion 25, a small movement at the front-side support portion 24 can prevent not only a positional deviation with respect to the platen glass 101 but also deformation of the reading guide member 23 from occurring. Besides, because the movement amount of the reading guide member 23 with respect to the front-side support portion 24 is formed smaller than that of the reading guide member 23 with respect to the rear-side support portion 25, it is possible to obtain a structure similar to the structure in which the reading guide member 23 is mounted on the main body 2 in such a manner that the reading guide member 23 cannot make any movement at the front-side support portion 24, thereby a considerably large positional deviation of the reading guide member 23 with respect to the platen glass 101 can be prevented for occurring.

Figure 8:
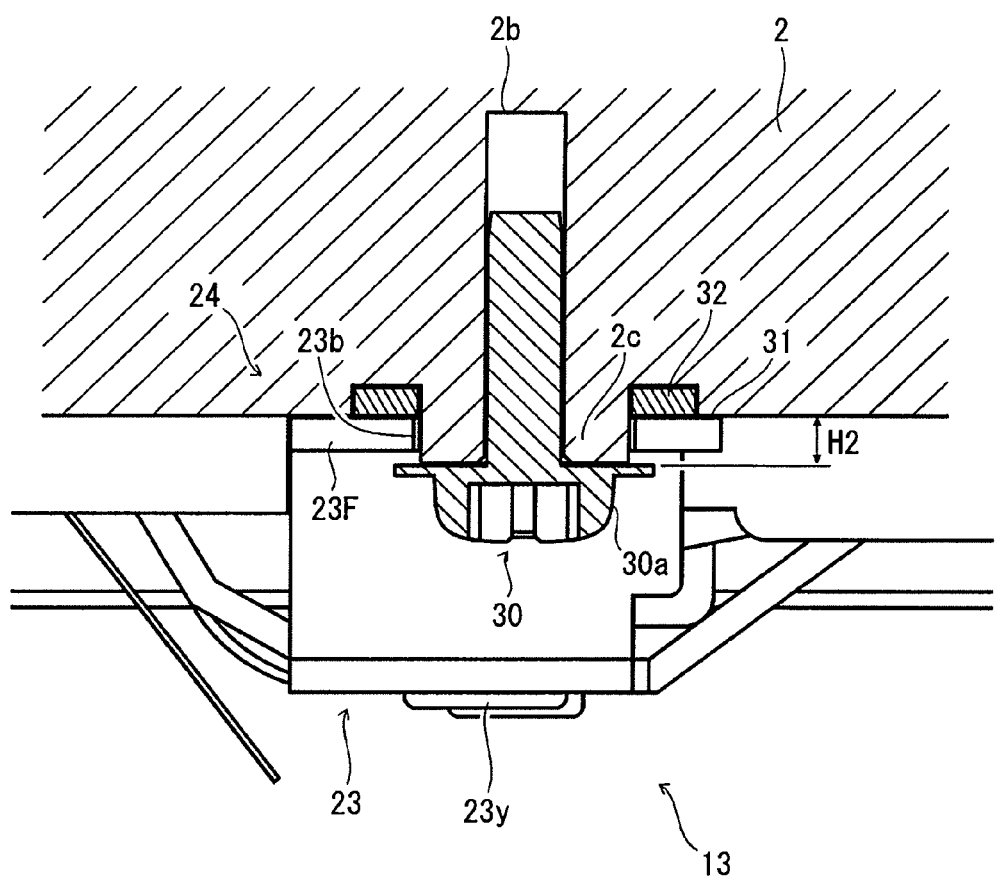
FIG. 8 is a front view in vertical section showing a front-side support portion of a reading guide member of a document carrying apparatus according to a second embodiment of the present invention.

Next, a structure of a document carrying apparatus according to a second embodiment of the present invention is described in detail using FIG. 8. FIG. 8 is a front view in vertical section showing the front-side support portion of the reading guide member. The basic structure in this embodiment is the same as that in the first embodiment explained using FIGS. 1 to 7, and the same structure as that in the first embodiment is not shown and the explanation is skipped.

As shown in FIG. 8, in the document carrying apparatus 1 according to the second embodiment, the front-side support portion 24 supporting the reading guide member 23 comprises an abut portion 31, and an elastic member 32 at the document reading portion 13.

The abut portion 31 is disposed at a position between the main body 2 and the engagement portion 23F of the reading guide member 23 in such a manner that the upper surface of the engagement portion 23F of the reading guide member 23 abuts the main body 2 in the process that the reading guide member 23 is displaced in the direction to move away from the platen glass 101, that is, in the upward direction in FIG. 8. Thus, the abut portion 31 prevents the reading guide member 23 from being displaced in the direction to move away from the platen glass 101.

The elastic member 32 is disposed between the main body 2 and the engagement portion 23F of the reading guide member 23 and in the inside of the abut portion 31 with respect to the horizontal direction. The elastic member 32 is a plate member that is made of a highly elastic material such as sponge and polyurethane, and at its central portion is provided with a through-hole through which the boss portion 2c of the main body 2 can be inserted. When the elastic member 32 is not pressed, the height of the elastic member 32 in the vertical direction is higher than the depth of the recessed portion in which the elastic member 32 is disposed facing the abut portion 31. When the document carrying apparatus 1 is closed with respect to the document reading apparatus 100, as shown in FIG. 8, the elastic member 32 is compressed in the depth direction of the recessed portion until the upper surface of the engagement portion 23F of the reading guide member 23 abuts the main body 2 at the abut portion 31. The elastic member 32 may be made of a spring or rubber.

As explained above, the front-side support portion 24 comprises: the abut portion 31 which prevents the reading guide member 23 from being further displaced in the direction to move away from the platen glass 101 after the reading guide member 23 abuts the main body 2; and the elastic member 32 which is disposed between the main body 2 and the reading guide member 23, made of a material such as sponge and polyurethane, and energizes the reading guide member 23 toward the platen glass 101. Accordingly, when setting a positional relationship between the reading guide member 23 and the platen glass 101 by making them contact with each other with the document carrying apparatus 1 closed with respect to the document reading apparatus 100, the effect of absorbing impact generated at the time of closing can be obtained. Besides, at the time of opening and closing the document carrying apparatus 1, noise can be prevented from being generated when the reading guide member 23 intermittently comes into contact with the main body 2. Accordingly, the positional relationship between a document and the platen glass 101 at the document reading portion 13 can be kept in a suitable state, and the document reading performance can be improved. In addition, the effects of impact absorption and noise prevention at the front-side support portion 24 supporting the reading guide member 23 can also be obtained.

Supra, the embodiments of the present invention are explained. However, the present invention is not limited to these embodiments, and various modifications can be made without departing from the scope and spirit of the present invention and put into practical use.

What is claimed is:

1. A document carrying apparatus which is configured to carry a document placed on a document placement tray to a document delivery tray, the document carrying apparatus having a side from which the document delivered to the document delivery tray is able to be taken out as a front side, and a side opposing the front side as a rear side, wherein the front side is configured to move up and down by means of a hinge mechanism disposed on the rear side such that the document carrying apparatus can be opened and closed with respect to a document reading apparatus, the document carrying apparatus comprising:

a main body; and a reading guide member which is disposed facing a platen glass of the document reading apparatus, and abuts the platen glass in the closed state to guide a document in such a manner that the document comes in contact with the platen glass, wherein the reading guide member includes support portions at an end portion of the front side and an end portion of the rear side, each of the support portions including: an engagement portion engaging with the main body; and a contact portion abutting the platen glass, whereby the reading guide member is supported by the main body via the support portions, in an opened state with respect to the document reading apparatus, the rear-side support portion is supported with an energizing member in such a manner that the rear-side support portion can be displaced in up and down directions to come close and move away to and from the main body in a gap space disposed between the rear-side support portion and the main body opposing a surface of the platen glass, and the front-side support portion is supported in such a manner that the front-side support portion can be displaced in up and down directions to come close and move away to and from the main body in a gap space disposed between the front-side support portion and the main body, the gap at the front-side support portion being formed smaller than the gap at the rear-side support portion, and in a closed state with respect to the document reading apparatus, at the rear-side support portion, the contact portion comes into contact with the platen glass, and at the front-side support portion, the engagement portion abuts the main body, and the contact portion abuts the platen glass to carry out the positioning of the reading guide member in the height direction on the front side.

2. The document carrying apparatus according to claim 1, wherein the reading guide member is supported on the main body with screws having a head larger than a diameter of a screw hole formed in the main body at the front-side support portion and the rear-side support portion, and can be displaced in the gap space disposed between the screw head and the main body in both the direction to come close to the platen glass and the direction to move away from the platen glass.

3. The document carrying apparatus according to claim 2, wherein a screw is inserted through a through-hole formed through the engagement portion that extends on the rear side of the reading guide member substantially horizontally, and the rear-side support portion is supported in such a manner that it can move in the gap space disposed between the screw head and the main body.

4. The document carrying apparatus according to claim 2, wherein a boss portion formed on the main body is inserted through a through-hole formed through the engagement portion that extends on the front side of the reading guide member substantially horizontally, and the front-side support portion is supported in such a manner that it can move in the gap space disposed between the screw head and an end surface of the main body outside the boss portion.

5. The document carrying apparatus according to claim 1, wherein the front-side support portion includes: an abut portion that prevents the reading guide member from being further displaced to move away from the platen glass after the reading guide member abuts the main body; and an elastic member that is disposed between the main body and the reading guide member and energizes the reading guide member toward the platen glass.

6. A document carrying apparatus whose front side is rotatably supported to move up and down on a hinge mechanism that is so disposed on a rear side of a document reading apparatus as to be substantially parallel with the document carrying direction so that the document carrying apparatus can be opened and closed with respect to the document reading apparatus, the document carrying apparatus comprising:
a main body; and
a reading guide member which is disposed facing a platen glass of the document reading apparatus, and abuts the platen glass in the closed state with respect to the document reading apparatus to guide a document in such a manner that the document comes in contact with the platen glass, wherein the reading guide member includes support portions on end portions of front and rear sides of the reading guide member, each of the support portions including: an engagement portion engaging with the main body; and a contact portion abutting the platen glass, the reading guide member being supported by the main body via the supporting portions, in the opened state with respect to the document reading apparatus, the rear-side support portion is supported by the main body with an energizing member in such a manner that the rear-side support portion can be displaced to come close and move away to and from the main body, and the front-side support portion is supported by the main body in such a manner that the front-side support portion can be displaced to come close and move away to and from the main body, and in the closed state with respect to the document reading apparatus, at the rear-side support portion, the contact portion comes into contact with the platen glass, and at the front-side support portion, the engagement portion abuts the main body, and the contact portion abuts the platen glass to carry out the positioning of the reading guide member in the height direction on the front side, and wherein the reading guide member is supported on the main body with screws at the front-side supporting portion and the rear-side supporting portion, and can be displaced between a screw head of each screw and the main body in both the direction to come close to the platen glass and the direction to move away from the platen glass.

7. The document carrying apparatus according to claim 6, wherein a screw is inserted through a through-hole formed through the engagement portion that extends on the rear side of the reading guide member substantially horizontally, and the rear-side support portion is supported in such a manner that it can move in a gap between the screw head and the main body.

8. The document carrying apparatus according to claim 6, wherein a boss portion formed on the main body is inserted through a through-hole formed through the engagement portion that extends on the front side of the reading guide member substantially horizontally, and the front-side support portion is supported in such a manner that it can move in a gap between the screw head and the main body outside the boss portion.

* * * * *